(12) United States Patent
Li et al.

(10) Patent No.: US 11,056,278 B2
(45) Date of Patent: Jul. 6, 2021

(54) CAPACITOR MODULE FOR USE IN AN INVERTER

(71) Applicant: Valeo Siemens eAutomotive Shenzhen Co., Ltd, Guangdong (CN)

(72) Inventors: Ronghui Li, Shenzhen (CN); Yu Qiu, Shenzhen (CN); Jun Liu, Shenzhen (CN); Huiling Wang, Shenzhen (CN)

(73) Assignee: VALEO SIEMENS EAUTOMOTIVE SHENZHEN CO., LTD., Guangdong (CN)

( * ) Notice: Subject to any disclaimer, the term of this patent is extended or adjusted under 35 U.S.C. 154(b) by 100 days.

(21) Appl. No.: 16/496,649

(22) PCT Filed: Mar. 24, 2017

(86) PCT No.: PCT/CN2017/078045
§ 371 (c)(1),
(2) Date: Sep. 23, 2019

(87) PCT Pub. No.: WO2018/170872
PCT Pub. Date: Sep. 27, 2018

(65) Prior Publication Data
US 2021/0110972 A1 Apr. 15, 2021

(51) Int. Cl.
*H01G 2/10* (2006.01)
*H01G 2/08* (2006.01)
(Continued)

(52) U.S. Cl.
CPC ............... *H01G 2/08* (2013.01); *H01G 2/103* (2013.01); *H01G 2/106* (2013.01); *H01G 4/236* (2013.01);
(Continued)

(58) Field of Classification Search
None
See application file for complete search history.

(56) References Cited

U.S. PATENT DOCUMENTS 9,241,428 B1  1/2016 Doo et al.
10,109,422 B2 * 10/2018 Koyama ............... H01G 4/002
(Continued)

FOREIGN PATENT DOCUMENTS

| CN | 103563234 A | 2/2014 |
| JP | 2016058688 A | 4/2016 |
| JP | 2017017861 A | 1/2017 |

OTHER PUBLICATIONS

International Search Report for PCT Serial No. PCT/CN2017/078045 dated Dec. 27, 2017.

*Primary Examiner* — Dion Ferguson
(74) *Attorney, Agent, or Firm* — McCormick, Paulding & Huber PLLC

(57) ABSTRACT

A capacitor module, in particular for use in an inverter of an electrical or a hybrid vehicle, said capacitor module comprising a housing, at least one capacitor element mounted in said housing and at least one busbar at least partially mounted into said housing and being electrically connected to said capacitor element, the housing comprising a bottom wall, a side wall and an upper wall, wherein said upper wall comprises a peripheral portion made of a sealing material and an central portion made of a thermal dissipation material, the thermal conductivity of the thermal dissipation material being bigger than the thermal conductivity of the sealing material.

20 Claims, 8 Drawing Sheets

(51) Int. Cl.
  *H01G 11/10* (2013.01)
  *H01G 11/18* (2013.01)
  *H02M 7/48* (2007.01)
  *H01G 4/236* (2006.01)
  *H01G 4/38* (2006.01)

(52) U.S. Cl.
  CPC .............. *H01G 4/38* (2013.01); *H01G 11/10* (2013.01); *H01G 11/18* (2013.01); *H02M 7/48* (2013.01)

(56) References Cited

U.S. PATENT DOCUMENTS

| | | | |
|---|---|---|---|
| 10,658,110 B2* | 5/2020 | Parigot | H01G 13/003 |
| 2006/0050468 A1* | 3/2006 | Inoue | H05K 3/301 |
| | | | 361/328 |
| 2009/0301601 A1* | 12/2009 | Enerson | C06D 5/06 |
| | | | 141/38 |
| 2011/0102966 A1* | 5/2011 | Takeoka | H01G 4/38 |
| | | | 361/301.3 |
| 2011/0317331 A1* | 12/2011 | Lee | H01G 9/155 |
| | | | 361/502 |
| 2014/0126107 A1* | 5/2014 | Yoda | H01G 4/38 |
| | | | 361/303 |
| 2014/0307360 A1* | 10/2014 | Parkin | H01G 2/106 |
| | | | 361/274.2 |
| 2014/0321090 A1* | 10/2014 | Guerin | H01G 9/26 |
| | | | 361/782 |
| 2017/0148770 A1* | 5/2017 | Ishino | H01L 23/492 |
| 2018/0019062 A1* | 1/2018 | Okuzuka | H01G 2/04 |
| 2020/0328026 A1* | 10/2020 | Nguyen | H01G 4/38 |
| 2020/0390000 A1* | 12/2020 | Sasaki | H05K 7/20927 |

* cited by examiner

CAPACITOR MODULE FOR USE IN AN INVERTER

CROSS-REFERENCE TO RELATED APPLICATIONS

This application is a National Stage application of International Patent Application No. PCT/CN2017/078045 filed on Mar. 24, 2017, which is hereby incorporated by reference in its entirety.

TECHNICAL FIELD

The present invention relates to a capacitor module, in particular for use in an inverter, and relates more particularly to a capacitor module providing simultaneously sealing and thermal dissipation of the heat generated by said capacitor module when it is electrically supplied.

BACKGROUND

In recent years, technologies in regard to electrical or hybrid vehicles travelling by using electricity are being rapidly developed. An electrical or a hybrid vehicle comprises a motor generating a rotation force, an inverter for controlling said motor and a battery for supplying power to said inverter.

In an existing solution, the inverter comprises a power module and an electric control unit, both mounted in a casing and a capacitor module, mounted on said casing. The electric control unit drives the power module for converting a direct current provided by the battery into alternating currents, commonly named "phase currents", for controlling the motor. The capacitor module is used for smoothing the voltage and provide ripper current.

In the example illustrated in FIG. 1, the capacitor module 10-1 comprises two busbars 21, 22 and two capacitor elements (not shown), mounted in a housing 30. Each busbar 21, 22 is electrically connected to one of the capacitor elements and comprises a first electrical connector 21A, 22A and a second electrical connector 21B, 22B, partially extending outside the housing 30 in order to connect the capacitor module 10-1 respectively to the battery and to the power module.

As shown on FIG. 2, the housing 30 comprises a side wall 32, an upper wall 34 and a bottom wall (not shown). The bottom wall and the side wall 32 are made of a one-piece plastic material and the upper wall is made of a sealing material, such as e.g. epoxy resin. Thus, when the capacitor module 10-1 is assembled, the assembly formed by the capacitor elements and the busbars 21, 22 is first mounted in the internal space delimitated by the bottom wall and the side wall 32, as illustrated in FIG. 1. Then, the upper wall 34 is formed by pouring some epoxy resin on the busbars 21, 22, sealing therefore the housing 30 while first electrical connectors 21A, 22A and second electrical connectors 21B, 22B extend outside said housing 30.

Such a capacitor module 10-1 may deliver currents at high power, for example typically more than 100 kW. In this case, the heat generated by the capacitor elements inside the housing 30 may be not evacuated efficiently, which may damage the capacitor module 10-1.

There is therefore a need for a capacitor module that allows evacuating the heat generated by the capacitors in an efficient manner.

SUMMARY

The present invention concerns a capacitor module, in particular for use in an inverter, in particular of an electrical or a hybrid vehicle, said capacitor module comprising a housing, at least one capacitor element mounted in said housing and at least one busbar at least partially mounted into said housing and being electrically connected to said capacitor element, the housing comprising a bottom wall, a side wall and an upper wall, wherein said upper wall comprises a peripheral portion made of a sealing material and a central portion made of a thermal dissipation material, the thermal conductivity of the thermal dissipation material being bigger than the thermal conductivity of the sealing material.

The capacitor module according to the invention allows simultaneously sealing the housing, in particular to prevent liquids or gases to pass through into the housing, and dissipating the heat, produced by the at least one capacitor element, through the central portion.

According to an aspect of the invention, the central portion is made of a gap filler material, i.e. a thermal interface material, which is a good thermal dissipation material (i.e. has high thermal conductivity).

According to an embodiment, the central portion is made of a silicon material, for example a silicone material comprising alumina powder, which has high thermal conductivity and high insulation level.

Advantageously, the central portion may comprise one or a plurality of layers. A plurality of layers allows increasing the insulation thickness of the upper wall while providing efficient evacuation of the heat.

In a preferred embodiment, the central portion comprises two layers.

The one layer or the plurality of layers may be one or a plurality of thermal dissipation pads. Such at least one pad provides advantageously an efficient contact with a mounting wall of a casing of an inverter, allowing thus an efficient evacuation of the heat.

Advantageously, the upper wall is substantially flat in order to easily fix the capacitor module on a mounting wall of an inverter. For example, the thickness of the central portion may be equal to the thickness of the peripheral portion.

According to an embodiment, the peripheral portion is made of epoxy resin.

According to an embodiment, the at least one capacitor element is a film capacitor element. Such film capacitor provides both a low Equivalent Series Resistance (ESR) and an important ripper current. Moreover, such film capacitor is safer and has a small size.

According to an aspect of the invention, the at least one busbar comprises a first electrical connector configured to be connected to a battery and a second electrical connector configured to be connected to a power module.

According to an embodiment, the capacitor module comprises two capacitor elements and two busbars, each busbar being electrically connected to at least one of the capacitor elements.

According to an embodiment, each capacitor element has a bottom face and a top face opposed to the bottom face, and each busbar comprises a first plate coming against the top face of one of the capacitor elements and a second plate coming against the bottom face of the other capacitor element, so that a first capacitor element has the first plate of the first busbar against its top, and the second plate of the second busbar against its bottom, and a second capacitor element has the first plate of the second busbar against its top, and the second plate of the first busbar against its bottom, for each busbar the first plate and the second plate being linked by a third plate perpendicular to the first and second plates.

Advantageously, the second plates of the busbars form a dissipating face for the capacitor module, improving thus heat dissipation of the busbars.

According to an embodiment, the first and second plates extends in two different parallel planes, the first plates being coplanar and the second plates being coplanar.

According to an embodiment, the third plates are located between the two capacitor elements.

According to an embodiment, the capacitor module further comprises an isolating sheet placed between the two busbars in order to prevent short-circuits between the two busbars.

The invention also concerns an inverter, in particular for use in an electrical or a hybrid vehicle, said inverter being configured for changing direct current to alternating current, said inverter comprising a casing and a capacitor module, as previously described, said casing comprising a mounting wall, said capacitor module being mounted on said mounting wall.

Advantageously, the capacitor module is mounted on the mounting wall so as to seal the interface between the peripheral portion and the central portion of said capacitor module. For example, the interface area between the peripheral portion and the central portion of said capacitor module may be glued onto the casing so as to fix the energy storage device while sealing the upper wall.

The invention also concerns a method of assembling a capacitor module, said method comprising the steps of:
  placing an assembly comprising at least one capacitor element and at least one busbar electrically connected to said capacitor element into a housing comprising a bottom wall and a side wall,
  placing a mask tool onto said assembly,
  pouring a sealing material around said mask tool, forming a peripheral portion of an upper wall of the housing, so as to fill the gap between the side wall, the at least one busbar and the mask tool,
  removing the mask tool, therefore forming an opening within the sealing material,
  placing at least one thermal dissipation layer integrally covering said opening, forming thus a central portion of the upper wall of the housing, the thermal conductivity of the thermal dissipation material being bigger than the thermal conductivity of the sealing material, and
  sealing the area between the peripheral portion and the central portion of the upper wall of the housing.

Advantageously, the sealing step may be performed using some attaching means (e.g. glue), allowing therefore the capacitor module to be mounted on a mounting wall of a casing of an inverter while sealing the interface area between the peripheral portion and the central portion of the upper wall of the housing.

Alternatively, any sealing material, such as e.g. silicone, may be used to seal the interface area between the peripheral portion and the central portion of the upper wall of the housing, prior to mounting the capacitor module on a mounting wall of a casing of an inverter.

The invention also concerns an electrical or a hybrid vehicle comprising an inverter as previously described.

The details of one or more embodiments are set forth in the accompanying drawings and the description below.

Other features will be apparent from the description and drawings, and from the claims.

DETAILED DESCRIPTION OF THE INVENTION

Figure 1:
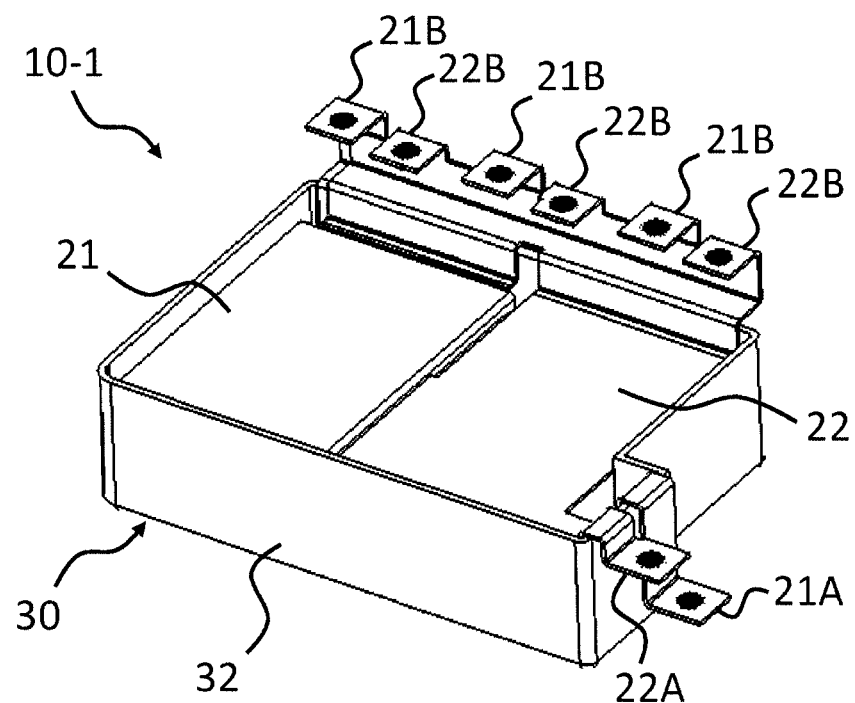
FIG. 1 (previously described) represents a perspective partial view of a capacitor module according to the prior art.
Figure 2:
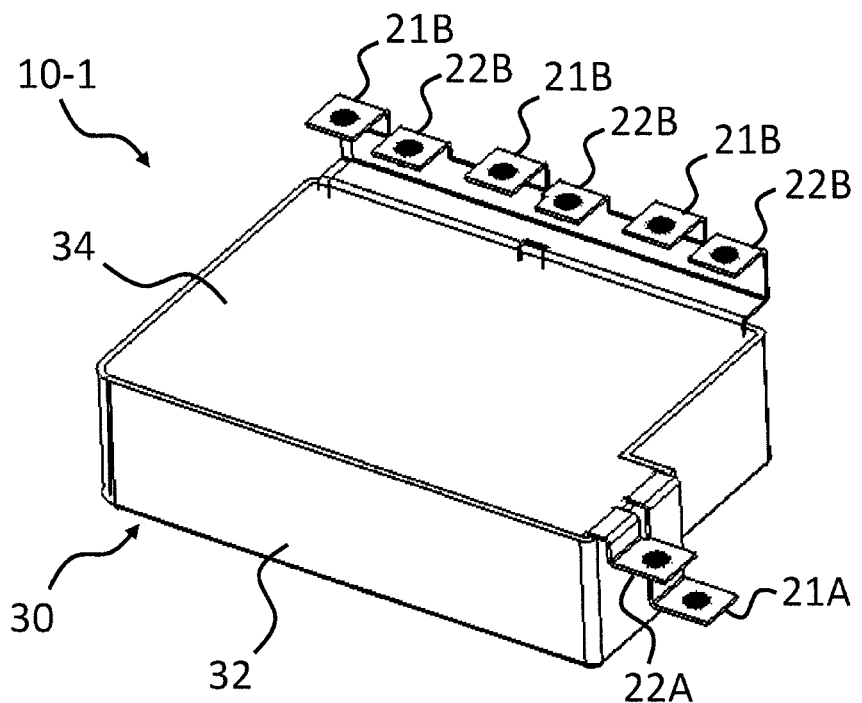
FIG. 2 (previously described) represents a perspective view of the capacitor module of FIG. 1.
Figure 3:
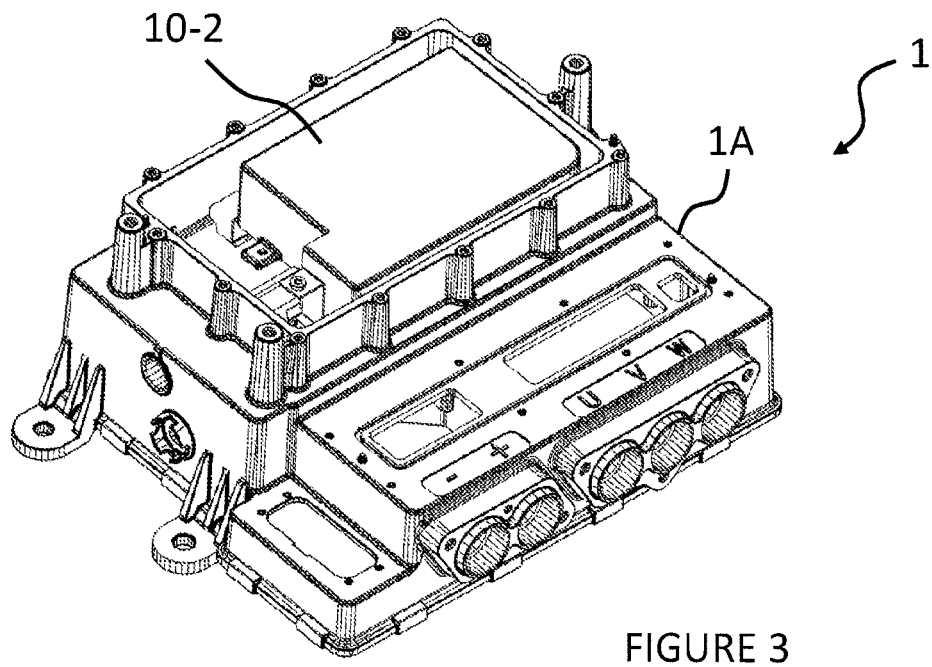
FIG. 3 represents a perspective view of an embodiment of a casing of an inverter according to the invention.

FIG. 3 illustrates an embodiment of an inverter 1 according to the invention. Such an inverter 1 is intended for use in an electrical or a hybrid vehicle (not shown) for controlling an electrical motor (not shown) of said vehicle. The inverter 1 comprises a casing 1A and a capacitor module 10-2 mounted on a mounting wall 1B (illustrated on FIGS. 13 and 14) of said casing 1A as described hereafter. The inverter 1 may further comprise a power module (not shown).

The capacitor module 10-2 is configured for changing direct current, received from a power supply such as a battery (not shown), to alternating current intended for controlling said electrical motor. In this example, the capacitor module 10-2 is configured for changing a direct current to three alternating (or phase) currents. Alternatively, the capacitor module 10-2 might be configured for changing a direct current into more or less than three phase currents without limiting the scope of the present invention.

Figure 4:
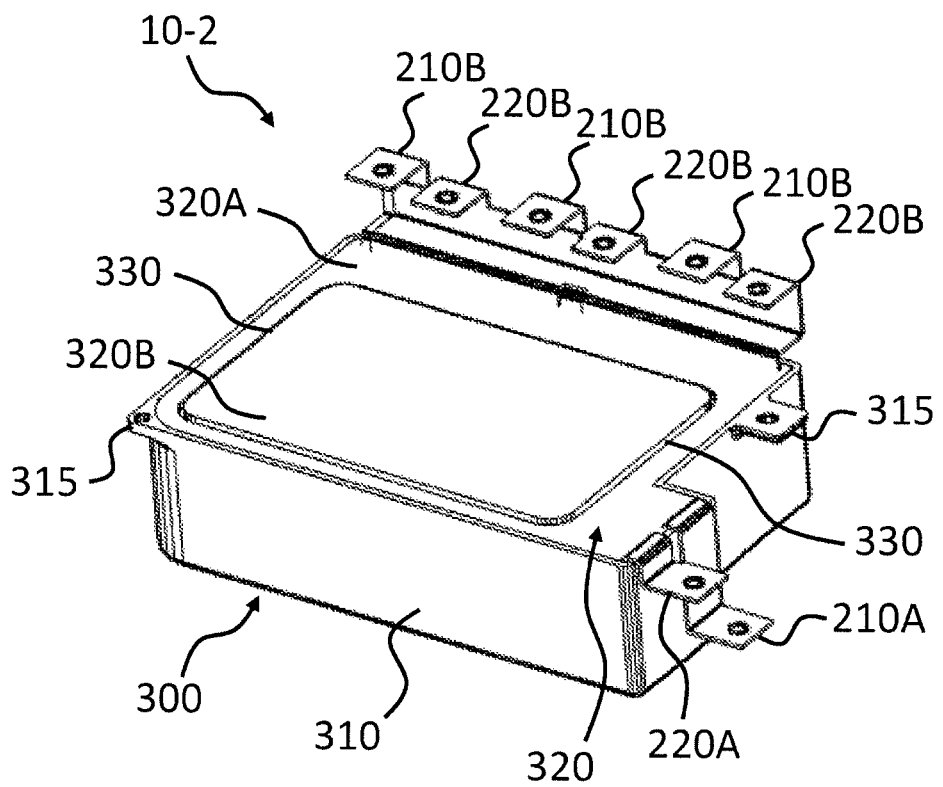
FIG. 4 represents a perspective view of an embodiment of a capacitor module according to the invention.
Figure 5:
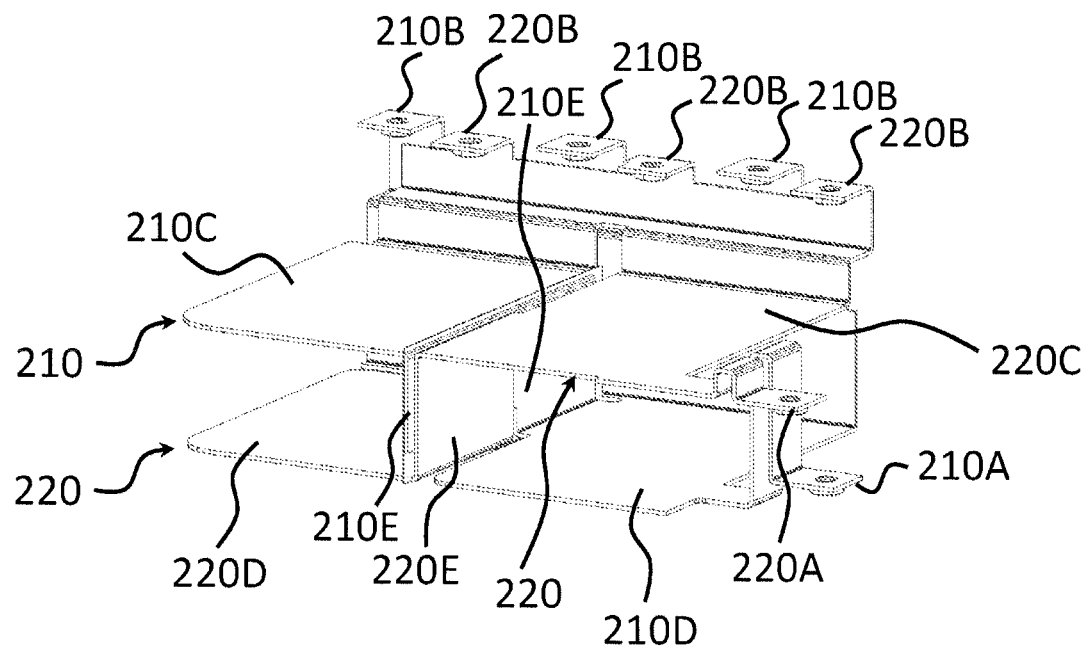
FIG. 5 represents a perspective view of an assembly comprising two busbars.
Figure 6:
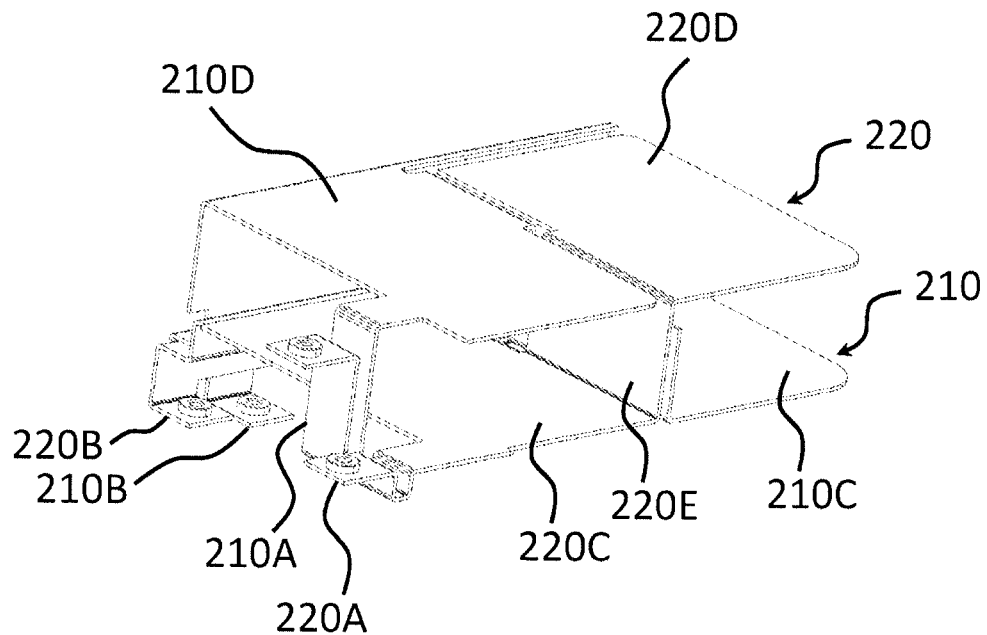
FIG. 6 represents another perspective view the assembly of FIG. 5.
Figure 7:
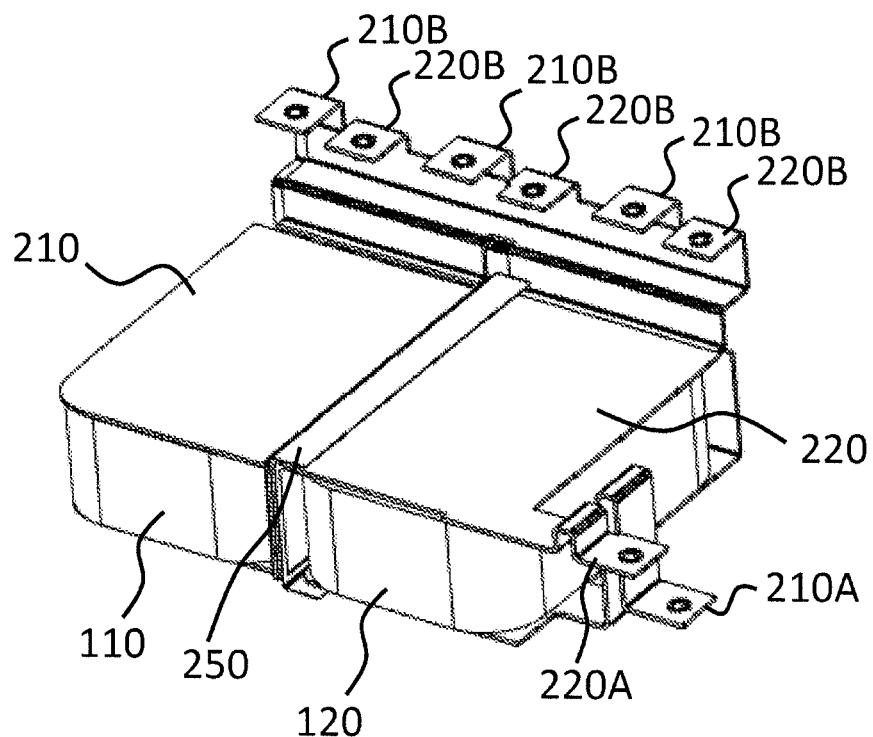
FIG. 7 represents a perspective view of an assembly comprising two film capacitors and two busbars.

FIG. 4 illustrates an embodiment of an assembled capacitor module 10-2 according to the invention. In reference to FIGS. 5 to 8, the capacitor module 10-2 comprises two capacitor elements 110, 120, two busbars 210, 220. The inverter 1 may further comprise other busbars (not shown).

In reference to FIGS. 5 to 8, each capacitor element 110, 120 has a bottom face and a top face opposed to the bottom face, and each busbar 210, 220 comprises a first plate 210C, 220C coming against the top face of one of the capacitor elements 110, 120 and a second plate 210D, 220D coming against the bottom face of the other capacitor element 110, 120, so that a first capacitor element 110 has the first plate 210C of the first busbar 210 against its top, and the second plate 220D of the second busbar 220 against its bottom, and a second capacitor element 120 has the first plate 220C of the second busbar 220 against its top, and the second plate 210D of the first busbar 210 against its bottom, for each busbar 210, 220 the first plate and the second plate being linked by a third plate 210E, 220E perpendicular to the first 210C, 220C and second plates 210D, 220D.

Each busbar 210, 220 comprises a first electrical connector 210A, 220A for connecting the power supply battery to the capacitor elements 110, 120 on one side and on another side a second electrical connector 210B, 220B for connecting a power module comprising notably semiconductor switches to control the motor.

In this example, the capacitor module 10-2 further comprises an isolating sheet 250 placed between the two busbars 210, 220 in order to prevent short-circuits between the two busbars 210, 220.

Figure 8:
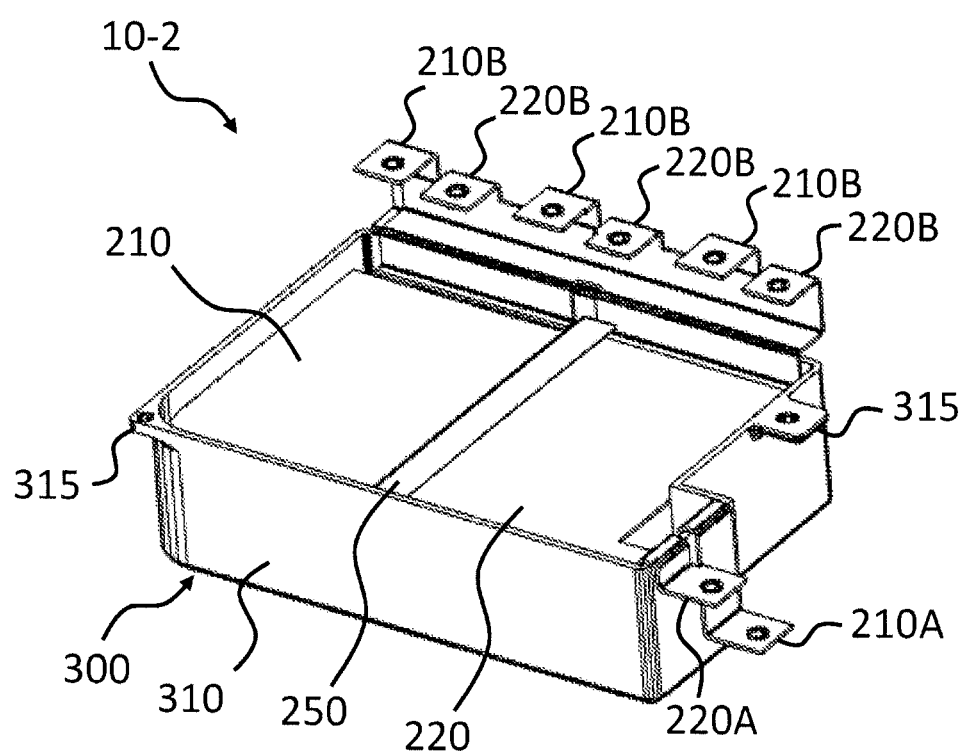
FIG. 8 represents a perspective view of the assembly of FIG. 7 mounted in a partial housing.

In reference to FIG. 8, the capacitor module 10-2 also comprises a housing 300 for receiving the assembly formed by the two capacitor elements 110, 120 and the two busbars 210, 220.

The housing 300 comprises a bottom wall 305 (in reference to FIG. 14 wherein the capacitor module 10-2 is showed upside down), a side wall 310 and an upper wall 320 (in reference to FIG. 4). In this example, the bottom wall 305 and the side wall 310 are formed in the same material, for example a plastic material, e.g. made of Polyphenylene Sulfide (PPS) Glass-Fiber (GF). Still in this example, the side walls 310 comprises fixation legs 315 (delimitating holes in the side wall) for fixing the capacitor module 10-2 to the casing 1A of the inverter, for example using screws.

The two capacitor elements 110, 120 are mounted in the housing 300, between the bottom wall 305 and the side wall 310. In this example, the capacitor elements 110, 120 are film capacitors, providing both a low Equivalent Series Resistance (ESR) and an important ripper current.

Each busbar 210, 220 is partially mounted into said housing 300 and electrically connected to the corresponding capacitor elements 110, 120 so that the first electrical connectors 210A, 220A and the two second electrical connectors 210B, 220B extend outside of the housing 300 as showed on FIGS. 9 to 12.

In reference to FIG. 4, in order to seal the capacitor module 10-2, the housing 300 comprises an upper wall 320 for closing the housing 300. As shown on FIG. 4, the upper wall 320 comprises a peripheral portion 320A made of a sealing material and a central portion 320B made of a thermal dissipation material, joining at an interface area 330.

The peripheral portion 320A allows sealing the housing 300, notably to prevent liquid to pass through into the housing 300, whereas the central portion 320B allows dissipating the heat produced by the two capacitor elements 110, 120. In other words, the thermal conductivity of the thermal dissipation material is bigger than the thermal conductivity of the sealing material.

Advantageously, the peripheral portion 320A may be made of epoxy resin and the central portion 320B may be made of a gap filler material or any suitable material having a good thermal conductivity.

The central portion 320B comprises one or several thermal dissipation layers, for example pads, placed to close the upper wall of the housing 300. When the central portion 320B comprises several thermal dissipation layers, said layers may be made of a same material or of different materials.

Figure 12:
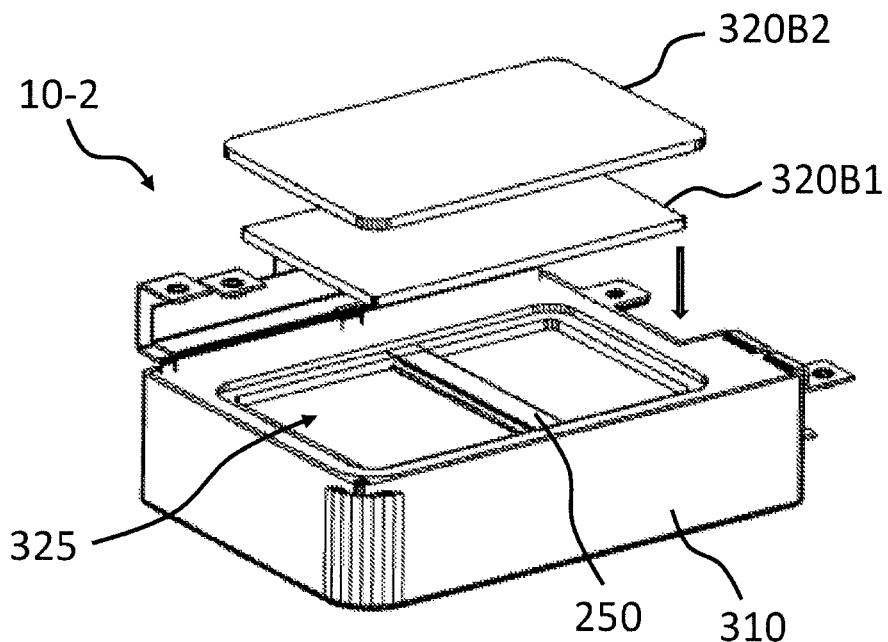
FIG. 12 represents a perspective view of the assembly of FIG. 11 showing two thermal dissipation layers being mounted in the opening formed by the mask tool in the sealing material.

In this exemplary embodiment, as illustrated on FIG. 12, the central portion 320B comprises two thermal dissipation pads 320B1, 320B2 laid on top of each other. The two thermal dissipation pads 320B1, 320B2 may be made of a silicone material, for example a silicone material comprising alumina powder, which has a good thermal conductivity.

Advantageously, the upper wall 320 is substantially flat in order to ease the fixing of the capacitor module 10-2 on the mounting wall 1B of the casing 1A of the inverter 1. In order to do so, the thickness of the central portion 320B may be equal to the thickness of the peripheral portion 320A so that the capacitor module 10-2 may be mounted easily on the mounting wall 1B of the casing 1A of the inverter 1.

An exemplary method of mounting the capacitor module 10-2 will now be described.

In a step S1, the assembly formed by the two capacitor elements 110, 120 and the two busbars 210, 220 (illustrated on FIG. 7) is placed in the housing 300, lying on the bottom wall 305, in between the side wall 310 as illustrated on FIG. 8.

Figure 9:
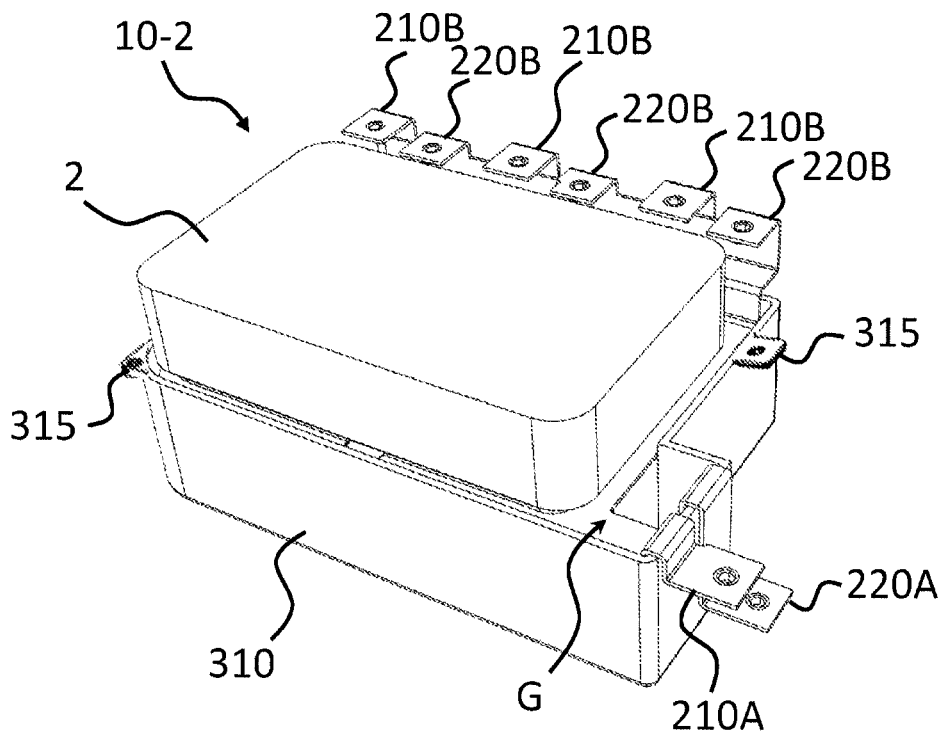
FIG. 9 represents a perspective view of the assembly of FIG. 8 further comprising a mask tool placed on the busbars.

In a step S2, as illustrated on FIG. 9, a mask tool 2 is placed on top of the busbars 210, 220 prior to forming the peripheral portion 320A of the upper wall 320. In the example, the longitudinal section of the mask tool 2 is rectangular. However, the mask tool 2 may present any adapted shape.

Figure 10:
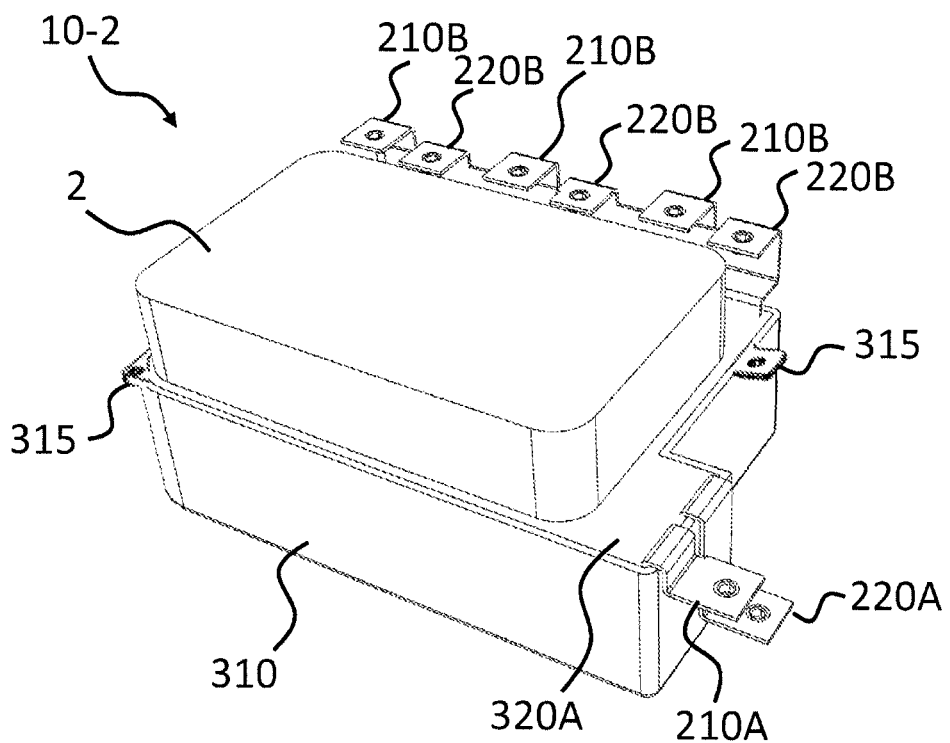
FIG. 10 represents a perspective view of the assembly of FIG. 9 further comprising a sealing material disposed around the mask tool.

In a step S3, an epoxy resin paste is poured around the mask tool 2 in order to form the peripheral portion 320A as illustrated on FIG. 10. The epoxy resin allows thus sealing the gap G (shown on FIG. 9) between on the one hand the side wall 310, and on the other hand the capacitor elements 110, 120, the first electrical connectors 210A, 220A, the second electrical connectors 210B, 220B and the mask tool 2.

Figure 11:
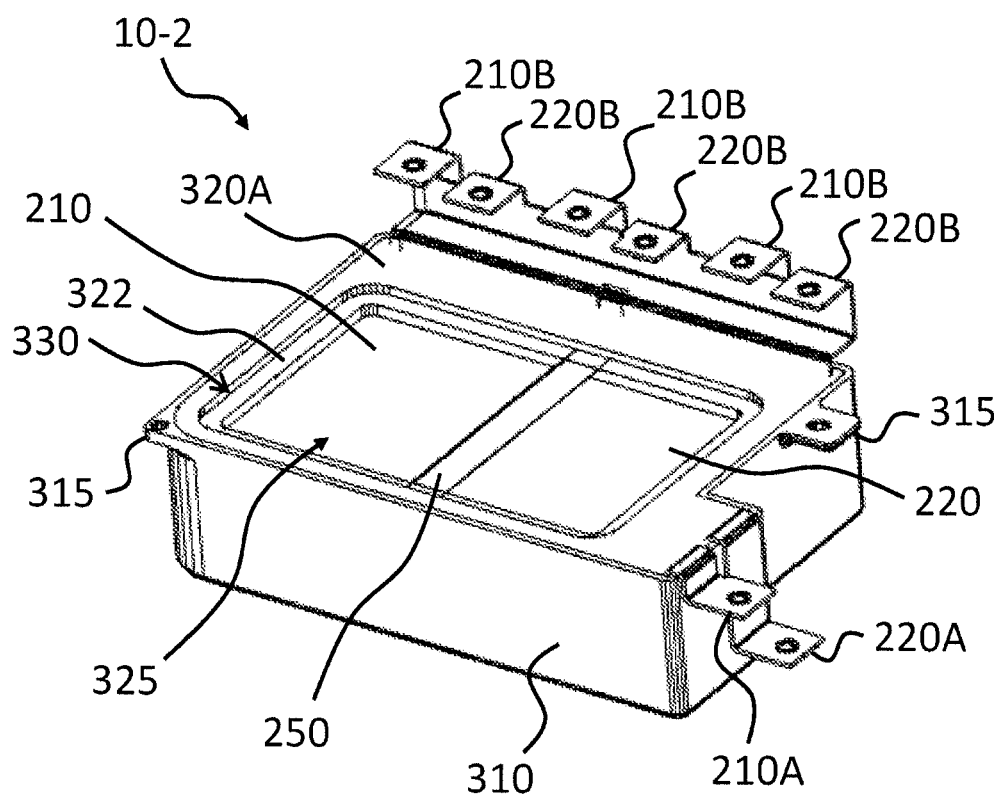
FIG. 11 represents a perspective view of the assembly of FIG. 10 wherein the mask tool has been removed.

When the epoxy resin has solidified or is close to have solidified, the mask tool 2 is removed in a step S4, delimitating therefore an opening 325 as illustrated on FIG. 11. The mask tool 2 is made of a material or has received a surface treatment that allows removing the mask tool 2 without sticking to the epoxy resin once it has solidified. For example, the mask tool 2 may be made of metal having received a surface treatment or of silicone.

The opening 325 is intended to be filled by a central portion 320B. In this example, in reference to FIG. 12, the central portion 320B comprises two layers: a first thermal dissipation pad 320B1 and a second thermal dissipation pad 320B2.

In a step S5, the first thermal dissipation pad 320B1 is placed on the busbars 210 and the isolating sheet 250, 220 in the opening 325 then a second thermal dissipation pad 320B2 is placed on top of the first thermal dissipation pad 320B1 in order to fully close the opening 325.

Advantageously, the thickness of the superimposed first and second thermal dissipation pads 320B1, 320B2 may be equal to the thickness of the peripheral portion 320A so that the upper wall 320 is substantially flat.

In this example, as shown on FIG. 11, the peripheral portion 320A comprises, in the interface area 330, an interface edge in a shape of a step 322 allowing advantageously to maintain the first thermal dissipation pad 320B1 in the volume defined within said step 322 and to receive the second thermal dissipation pad 320B2 onto said step 322, helping sealing the interface area 330.

In a step S6, the interface area 330 (in reference to FIG. 4) between the peripheral portion 320A and the central portion 320B of the upper wall 320 of the housing 300 is sealed.

Figure 13:
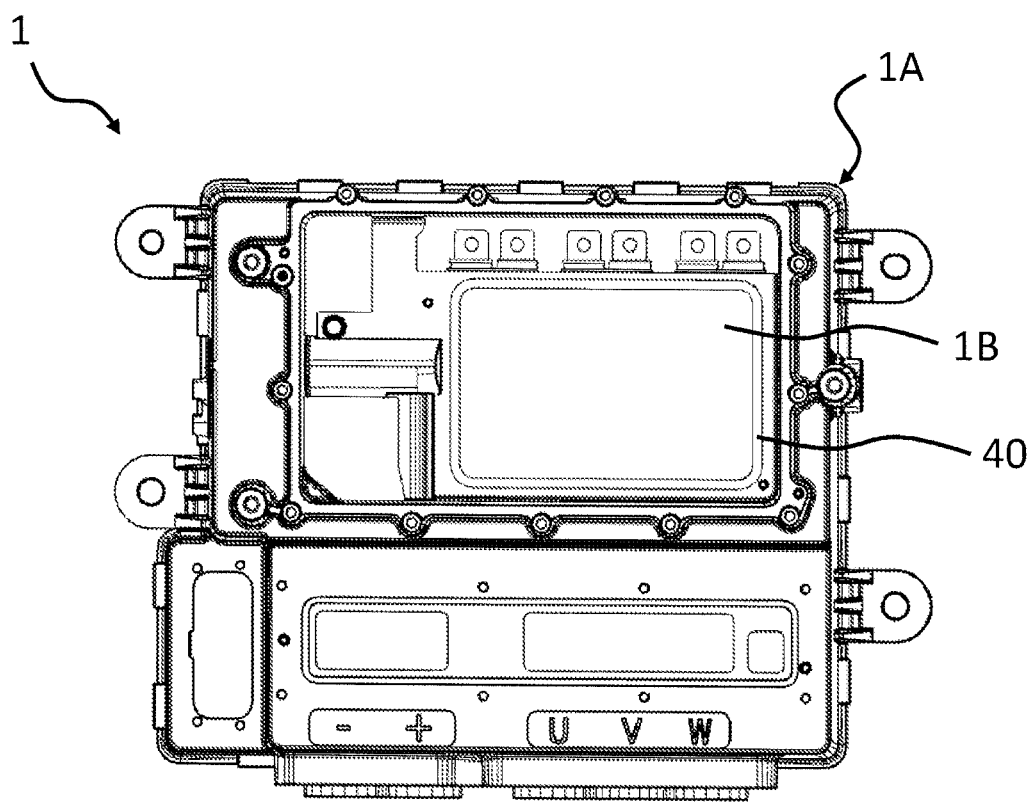
FIG. 13 represents a top view of a casing of an inverter, said casing comprising a mounting wall on which glue has been applied to receive the capacitor module of FIG. 3.
Figure 14:
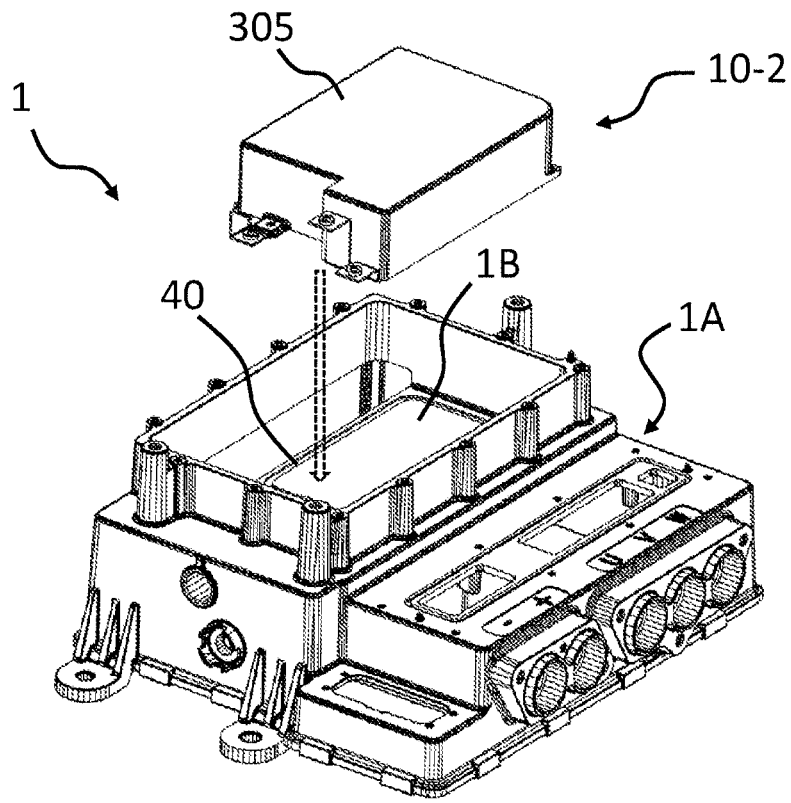
FIG. 14 represents a perspective side view of the casing of FIG. 13 while a capacitor module is being mounted on the mounting wall of said casing.
Figure 15:
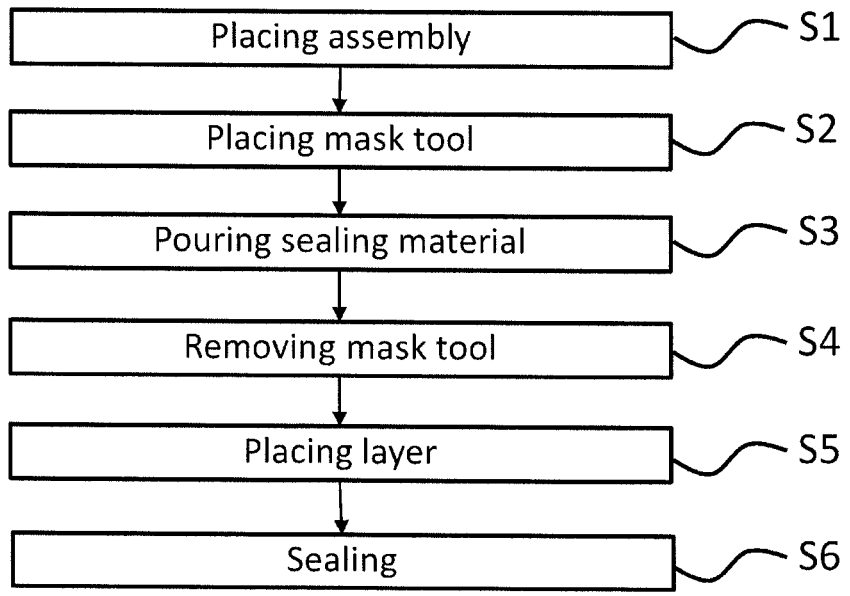
FIG. 15 illustrates an embodiment of the method according to the invention.

In a preferred embodiment, as shown on FIGS. 13 and 14, a glue line 40, having substantially the shape and size of the edge of the central portion 320B (i.e. the shape and size of the opening 325) is applied on the mounting wall 1B of the casing 1A.

Then, the capacitor module 10-2 is positioned against said glue line 40 so that the interface area 330 between the peripheral portion 320A and the central portion 320B of the capacitor module 10-2 gets glued and sealed while fixing the capacitor module 10-2 to the casing 1A.

Alternatively, any sealing material, such as e.g. silicone, may be used to first seal the interface area 330 between the peripheral portion 320A and the central portion 320B of the upper wall 320 of the housing 300, prior to mounting the capacitor module 10-2 on the mounting wall 1B of the casing 1A of the inverter 1, e.g. using any suitable fixing means (glue, screws, etc.).

Although embodiments have been described with reference to a number of illustrative embodiments thereof, it should be understood that numerous other modifications and embodiments can be devised by those skilled in the art that will fall within the spirit and scope of the principles of this disclosure.

More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A capacitor module, in particular for use in an inverter of an electrical or a hybrid vehicle, said capacitor module comprising a housing, at least one capacitor element mounted in said housing and at least one busbar at least partially mounted into said housing and being electrically connected to said capacitor element, the housing comprising a bottom wall, a side wall and an upper wall, wherein said upper wall comprises a peripheral portion made of a sealing material and a central portion made of a thermal dissipation material, the thermal conductivity of the thermal dissipation material being bigger than the thermal conductivity of the sealing material.

2. The capacitor module according to claim 1, wherein the central portion is made of a gap filler material.

3. The capacitor module according to claim 1, wherein the central portion is made of a silicone material.

4. The capacitor module according to claim 3, wherein the central portion is made of a silicone material comprising alumina powder.

5. The capacitor module according to claim 1, wherein the central portion comprises a plurality of layers.

6. The capacitor module according to claim 5, wherein, the central portion comprises two layers.

7. The capacitor module according to claim 1, wherein the thickness of the central portion is equal to the thickness of the peripheral portion.

8. The capacitor module according to claim 1, wherein the peripheral portion is made of epoxy resin.

9. The capacitor module according to claim 1, wherein the at least one busbar comprises a first electrical connector configured to be connected to a battery and a second electrical connector configured to be connected to a power module.

10. The capacitor module according to claim 1, said capacitor module comprising two capacitor elements and two busbars, each busbar being electrically connected to at least one of the capacitor elements.

11. The capacitor module according to claim 10, wherein each capacitor element has a bottom face and a top face opposed to the bottom face, and each busbar comprises a first plate coming against the top face of one of the capacitor elements and a second plate coming against the bottom face of the other capacitor element, so that a first capacitor element has the first plate of the first busbar against its top, and the second plate of the second busbar against its bottom, and a second capacitor element has the first plate of the second busbar against its top, and the second plate of the first busbar against its bottom, for each busbar the first plate and the second plate being linked by a third plate perpendicular to the first and second plates.

12. An inverter, in particular for use in an electrical or a hybrid vehicle, said inverter being configured for changing direct current to alternating current, said inverter comprising a casing and a capacitor module mounted on said casing, said casing comprising a mounting wall, said capacitor module being mounted on said mounting wall, wherein the capacitor module comprises a housing, at least one capacitor element mounted in said housing and at least one busbar at least partially mounted into said housing and being electrically connected to said capacitor element, the housing comprising a bottom wall, a side wall and an upper wall, wherein said upper wall comprises a peripheral portion made of a sealing material and a central portion made of a thermal dissipation material, the thermal conductivity of the thermal dissipation material being bigger than the thermal conductivity of the sealing material.

13. The inverter according to claim 12, wherein the capacitor module is mounted on the mounting wall so as to seal the interface area between the peripheral portion and the central portion of said capacitor module.

14. A method of assembling a capacitor module for use in an inverter, said method comprising the steps of:

placing an assembly comprising at least one capacitor element and at least one busbar electrically connected to said capacitor element into a housing comprising a bottom wall and a side wall, placing a mask tool onto said assembly, pouring a sealing material around said mask tool, forming a peripheral portion of an upper wall of the housing, so as to seal the gap between the side wall, the at least one busbar and the mask tool, removing the mask tool, therefore forming an opening within the sealing material, placing at least one thermal dissipation layer integrally covering said opening, forming a central portion of the upper wall of the housing, the thermal conductivity of the thermal dissipation material being bigger than the thermal conductivity of the sealing material, and sealing the area between the peripheral portion and the central portion of the upper wall of the housing.

15. The method according to claim 14, wherein the sealing step is performed using some attaching means, allowing therefore the capacitor module to be mounted on a mounting wall of a casing of an inverter while sealing the interface area between the peripheral portion and the central portion of the upper wall of the housing.

16. The capacitor module according to claim 2, wherein the central portion is made of a silicone material.

17. The capacitor module according to claim 2, wherein the central portion comprises a plurality of layers.

18. The capacitor module according to claim 3, wherein the central portion comprises a plurality of layers.

19. The capacitor module according to claim 4, wherein the central portion comprises a plurality of layers.

20. The capacitor module according to claim 2, wherein the thickness of the central portion is equal to the thickness of the peripheral portion.

* * * * *